Feb. 26, 1963  R. S. DICKINSON  3,079,171
LOAD COMPENSATING ARRANGEMENT FOR A VEHICLE SUSPENSION
Original Filed Dec. 3, 1959  2 Sheets-Sheet 1

INVENTOR.
RONALD S. DICKINSON
BY
Mead, Browne, Schuyler and Beveridge
ATTORNEYS

Feb. 26, 1963  R. S. DICKINSON  3,079,171
LOAD COMPENSATING ARRANGEMENT FOR A VEHICLE SUSPENSION
Original Filed Dec. 3, 1959  2 Sheets-Sheet 2

INVENTOR
RONALD S. DICKINSON
BY
Mead, Browne, Schuyler and Beveridge
ATTORNEYS

United States Patent Office 3,079,171
Patented Feb. 26, 1963

3,079,171
LOAD COMPENSATING ARRANGEMENT FOR A VEHICLE SUSPENSION
Ronald Sidney Dickinson, Osbaldwick, York, England, assignor to Armstrong Patents Co. Limited, Beverley, Yorkshire, England, a British company
Original application Dec. 3, 1959, Ser. No. 857,114, now Patent No. 3,021,153, dated Feb. 13, 1962. Divided and this application Sept. 22, 1961, Ser. No. 157,290
5 Claims. (Cl. 280—124)

This application is a division of my co-pending application Serial No. 857,114, filed December 3, 1959, now Patent No. 3,021,153, said co-pending application being a continuation-in-part of my now abandoned application, Serial No. 738,464, filed May 28, 1958.

The present invention concerns road vehicle suspension systems.

In most types of vehicle suspensions, especially those utilising metal suspension springs, the distance between the wheel mounting and the chassis or frame is variable, being dependent upon the load carried by the chassis or frame and the resilience of the springs supporting the chassis or frame from the wheel mountings.

An object of the present invention is to provide an arrangement for maintaining a substantially uniform distance between the wheel mounting and the chassis or frame of a motor vehicle, irrespective of the loading conditions on the vehicle chassis or frame.

Another object of the invention is to provide a load compensating arrangement for a vehicle suspension in which hydraulic pump means operable responsive to normal road surface irregularities are employed in co-operation with hydraulic relief means to maintain the displacement between a vehicle wheel mounting and the vehicle frame within a predetermined range of displacements.

Yet another object of the invention is to provide hydraulic ram means having a cylinder member with a movable member therein adapted to modify the attitude of a suspension spring relative to the vehicle frame responsive to changes in vehicle loading.

These and other objects of the invention will be described further, by way of example, with reference to the accompanying drawings, in which.

Throughout the drawings, similar reference numerals are employed wherever appropriate to denote similar parts.

Figure 1:
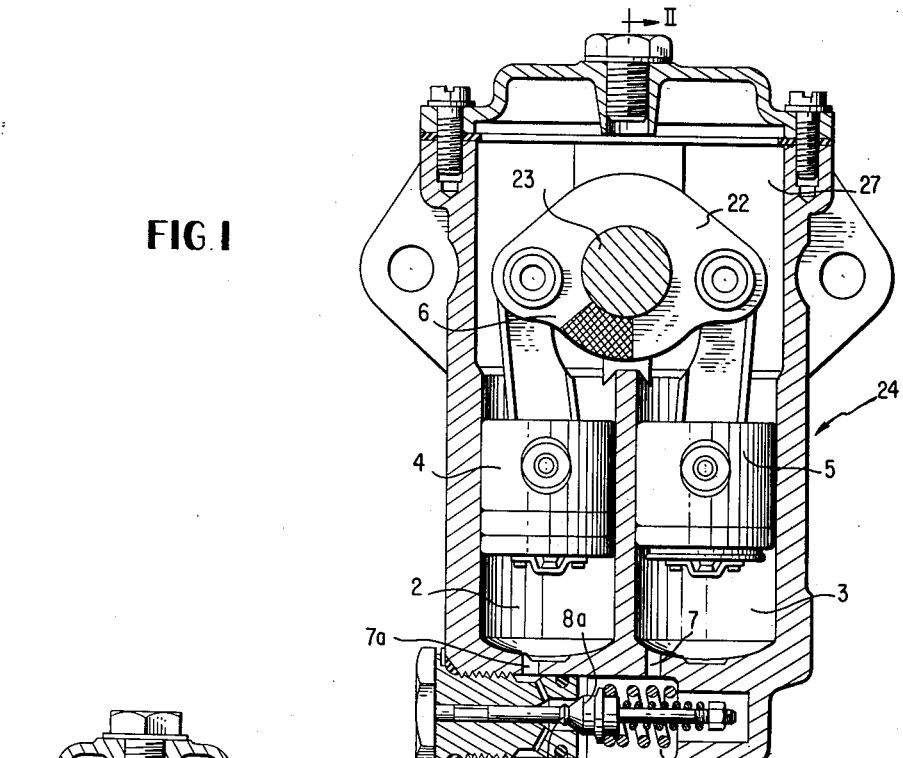
FIG. 1 is a sectional elevation of a shock absorber and control unit used in the present invention.
Figure 2:
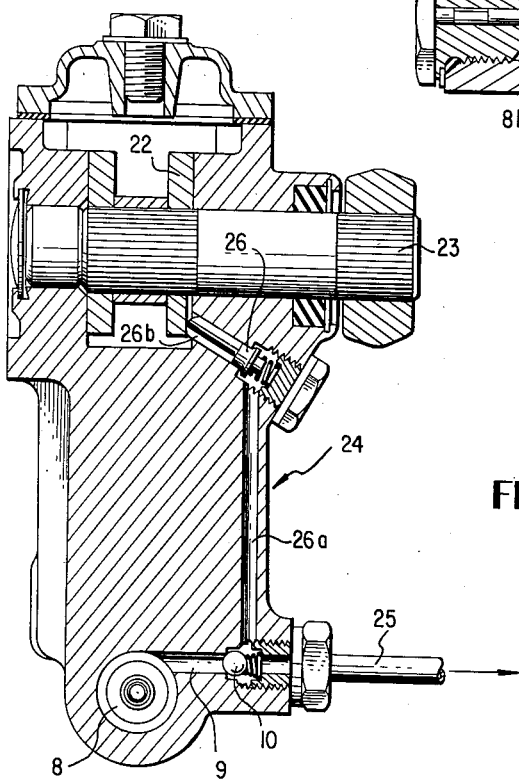
FIG. 2 is a sectional elevation on the line II—II of FIG. 1.
Figures 5, 6:
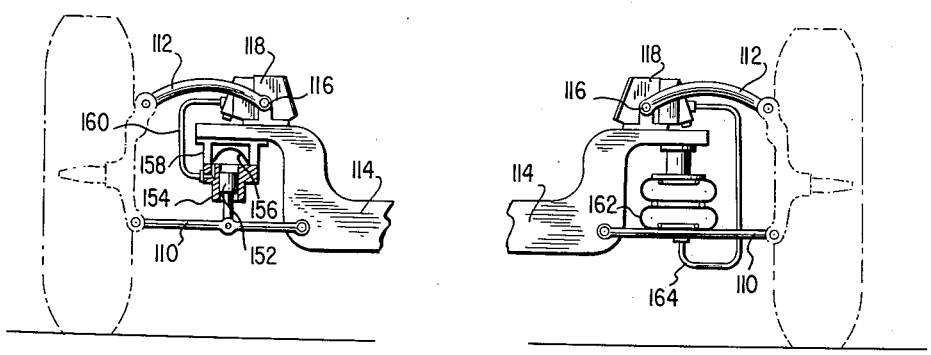

In the embodiment illustrated in FIGS. 1, 2 and 5 there is shown a control unit 24 (118 in FIG. 5) which comprises a pair of substantially parallel cylinders 2 and 3 which communicate with one another by way of ports 7 and 7a at their lower ends, and through valve chamber 8 wherein are arranged valves 8a and 8b adapted to provide differential pressure paths to hydraulic medium between the two cylinders, on compression and rebound movements of the wheel through lever 112 (FIG. 5). In FIGS. 1 and 2 the cylinder 3 is shown as co-operating with its piston 5 to constitute a pump for supplying conduit 25 with a hydraulic medium which is placed under pressure by the pump against the reaction of the shock adsorber valves 8a and 8b. The cylinder 3 communicates via port 7, valve chamber 8 and passage 9 with the conduit 25. A means sensitive to the riding height of the vehicle is constituted by a relief valve 26 communicating with conduit 25 by way of passage 26a, the valve 26 being placed in open or closed condition by means of a depressed cam surface 6 formed on the yoke 22 and arranged to act on the stem 26b of the valve 26. It will be appreciated that the cam surface 6 may be formed separately from the yoke 22 if desired. The valve stem 26b is provided with longitudinal grooves to enable hydraulic medium flowing through the passage 26a to pass to a reservoir chamber 27 and/or an auxiliary reservoir provided in or independently of the combined shock absorber and control arrangement 24 above the cylinders 2 and 3 thereof. The cam surface 6 is so arranged on the yoke 22 as to be just incident upon the valve stem 26b when the piston 5 is at a desired mean position in the cylinder 3, and the vehicle is at a desired riding height.

In the operation of the embodiment of the invention illustrated in FIGS. 1, 2, and 5, assuming firstly that the vehicle is at its desired riding height, and that the cam surface 6 is incident upon the valve stem 26b of the relief valve 26, riding movements of the wheel arising from continued travel of the vehicle will be transmitted by the lever arm 112 to the rocking shaft 116 and hence to the yoke 22. The pistons 4 and 5 will hence oscillate in their cylinders 2 and 3 in conventional manner to co-operate with the valves 8a, 8b in imparting shock absorbing action to the axle 11, and this motion of the piston 5 in its cylinder 3 will cause hydraulic medium to be transferred through the conduit 25 (FIG. 3) or conduit 160 (FIG. 5) to the ram cylinder 154. The ram 152 is thus slightly displaced from the cylinder 154, and slightly raises the chassis member 114. Immediately this happens, however, the shaft 23 is angularly displaced by the consequent depression of the lever 112, and the yoke 22 is angularly displaced to depress the valve stem 26b and lift the valve 26 momentarily off its seat. Thus, the ram cylinder 154 is placed, by way of conduit 25 (FIG. 3) or conduit 160 (FIG. 5), passage 26a and valve 26 in communication with the reservoir 27 and a small quantity of hydraulic medium is allowed by the momentary opening of valve 26 to exhaust from the ram cylinder into the reservoir, until the ram 152 has restored the wheel and chassis member 114 to their desired mean spacing. As long as the load on the vehicle remains unchanged, therefore, the operation of the suspension remains as described above, with momentary opening and closing of the valve 26 taking place to maintain the vehicle at a mean riding height despite the constant pumping action of the piston 5.

Should the load on the vehicle be increased, however, so that the chassis member 15 sinks and lifts the lever 112, then the yoke 22 is moved anticlockwise by the shaft 23, and the cam surface 6 comes into register with the valve stem 26b, causing the valve 26 completely to close. Continued riding movements of the vehicle then cause the piston 5, in oscillating due to those movements, to pump hydraulic medium from the cylinder 3 to the ram cylinder 154, whereby the ram 152 is displaced from the cylinder to restore the spacing between the chassis member 15 and wheel to its mean value, thus restoring the vehicle riding height to its desired mean value. Displacement of the ram 152 from the cylinder 154 continues, of course, until consequent clockwise movement of the yoke 22 resulting from the restoring effect of the ram 152 moves the cam surface 6 off the valve stem 26b and allows valve 26 to resume the repeated momentary opening and closing procedure described above.

Conversely, should the load on the vehicle be decreased, then the yoke 22 is moved clockwise as the spacing between the chassis member 114 and the wheel increases, and consequently hydraulic medium is allowed to exhaust from the ram cylinder 154 back into the reservoir 27 until the ram 152 has re-entered the cylinder 154 to an extent sufficient to restore the chassis 114 and wheel spacing to its required mean value.

The application of the invention to pneumatic spring suspensions is shown in FIGS. 3 to 6 of the drawings.

Figure 3:
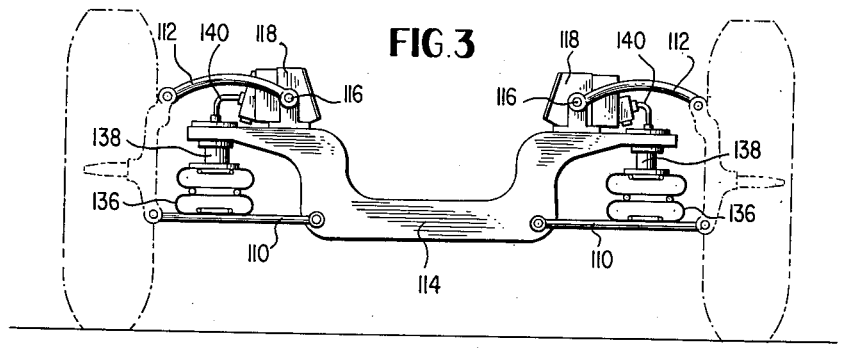
FIGS. 3 to 6 are generally diagrammatic end elevations of embodiments of the invention employing pneumatic springs.

Referring now to FIG. 3 there is shown a vehicle suspension wherein the pneumatic springs 136 are of bellows construction, each comprising a plurality of interconnecting and superposed toroidal chambers closed by imperforate end plates. Each pneumatic spring is secured at one end to one of the lower levers 110 and at each upper end carries a hydraulic ram 138 which is in turn secured to the vehicle chassis or frame 114 i.e. is interposed between the vehicle chassis or frame and the pneumatic spring. Each hydraulic ram is connected by the conduit 140 to one of the shock absorbers 118. In the operation of this embodiment of the invention the pumping action exerted by the shock absorbers 118, coupled with the repeated momentary opening of the relief valves incorporated therein, serves to maintain the chassis or frame 114 at the desired riding height so long as the vehicle loading remains unchanged. If the vehicle loading is increased however the relief valves are closed due to the rotary displacement of the shafts 116 by levers 112 and the shock absorbers 118 supply hydraulic medium under pressure to the hydraulic rams 138 to cause the same to extend and raise the chassis 114 relative to the wheel mounting. Expansion of the ram 138 ceases when the shafts 116 once again commence to effect repeated momentary openings of the relief valves. If the vehicle loading is decreased, of course, the relief valves open to allow hydraulic medium to exhaust from the rams back to the shock absorber reservoirs.

Figure 4:
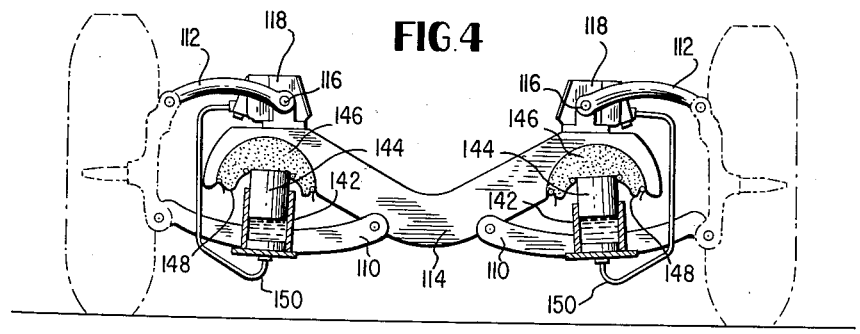

FIG. 4 shows an embodiment of the invention wherein a hydraulic ram cylinder 142 housing a displaceable ram 144 is secured to each of the lower levers 110. To the vehicle chassis or frame 114 are secured a pair of pneumatic pressure chambers 146, the lower faces of which are closed by flexible or elastic diaphragms 148 to which the outer ends of the rams 144 are fixedly connected. The hydraulic cylinders 142 are connected by way of conduits 150 with the shock absorbers 118. The operation of this embodiment of the invention is similar to that of the embodiment already described above, in that increased vehicle loading causes the hydraulic shock absorbers 118 to pump hydraulic medium under pressure in the cylinders 142 and so to cause extension of the rams 144 serving to raise the vehicle chassis or frame 114 until such time as the resulting rotary displacement of shafts 116 (shaft 23 of FIGS. 2 and 3) once again permits momentry operation of the relief valves. If the vehicle loading is decreased, the relief valves simply open to allow hydraulic medium to exhaust from the cylinders 142 back to the reservoirs of the shock absorbers 118.

A somewhat similar embodiment of the invention to that of FIG. 4 is shown in FIG. 5, with the difference that in FIG. 5 the hydraulic medium affecting extension of retraction of the ram is interposed between the ram and the pneumatic spring. It will be seen in FIG. 5 that the lower lever 110 has a ram 152 pivotally attached thereto and displaceable in a cylinder 154 which at its upper end is closed by a flexible diaphragm 156. The flexible diaphragm 156 is retained on the cylinder 154 by means of an annular end cap 158 which is in turn secured to the vehicle chassis or frame 114. The space enclosed by the flexible diaphragm 156 is filled with hydraulic medium supplied from the shock absorbers 118 by way of conduit 160 and the space between the flexible diaphragm 156 and the annular end cap 158 constitutes a pneumatic suspension spring. The movement of the hydraulic medium between the shock absorber 118 and cylinder 154, controlled by the relief valve an described above, results in extension or retraction of the ram 152 within cylinder 154 to compensate for increased or decreased vehicle loading.

Another embodiment of the invention, shown in FIG. 6, includes a pneumatic spring 162 of bellows construction somewhat similar to that shown in FIG. 3, the spring 162 being mounted between the lower lever 110 and the vehicle chassis or frame 114. To the lower end of the spring 162 is connected a hydraulic conduit 164 adapted to supply hydraulic medium under pressure from the shock absorber 118 to the interior of spring 162, thereby to act against a pneumatic medium filling the remainder of the interior of spring 162. The addition of hydraulic medium to spring 162 or the exhaust of hydraulic medium therefrom will be observed to result in extension or contraction of spring 162 to compensate respectively for increases or decreases in vehicle loading in much the same way as already described.

This application is a continuation-in-part of my copending application Serial No. 738,464 filed May 28, 1958, now abandoned.

I claim:

1. In a vehicle suspension system comprising a vehicle wheel mounting, a vehicle frame, said wheel mounting having an upper and a lower link member pivotally connected to said frame, a pneumatic suspension spring supporting said frame upon said wheel mounting, said pneumatic suspension spring being seated in compression between the frame and one of said link members, and a double acting hydraulic shock absorber coupled between said frame and said wheel mounting to damp vibrations of said suspension spring, said shock absorber having a compression chamber and rebound chamber containing hydraulic medium connected to each other by a valve controlled passage, and a piston assembly positioned within said chambers in accordance with the displacement between said frame and said wheel mounting and operable to displace fluid from one of said chambers to the other through said valve controlled passage in accordance with relative movement between said wheel member and said frame; the improvement comprising means defining a hydraulic reservoir, a hydraulic ram means having a cylinder member and a movable member therein, said hydraulic ram means being positioned to act directly on said pneumatic spring for varying the displacement between said wheel mounting and said frame in accordance with the pressure of hydraulic medium in said cylinder member, a first conduit connecting said cylinder member to said reservoir for transferring hydraulic medium between said cylinder member and said reservoir, a first one way valve in said conduit adjacent said reservoir normally seated to prevent flow of hydraulic medium into said reservoir, a second conduit connecting said valve controlled passage to said first conduit at a location between said first one way valve and said cylinder member, a second one way valve in said second conduit permitting flow of hydraulic medium therethrough only from said valve controlled passage into said first conduit when the pressure in said passage exceeds the pressure in said first conduit, and cam means coupled to said piston assembly for opening said first one way valve when the displacement between said wheel mounting and said frame differs from a predetermined range of displacements.

2. A vehicle suspension as defined in claim 1 wherein one of said hydraulic ram members is carried by said frame.

3. A vehicle suspension as defined in claim 1 wherein one of said hydraulic ram members is carried by said one link member.

4. A vehicle suspension as defined in claim 1 wherein a pneumatic spring comprises a chamber secured to said frame, and a flexible diaphragm closing the region of said chamber remote from said frame, one member of said hydraulic ram means being connected to said flexible diaphragm and the other member of said ram means being carried by one of said link members.

5. A vehicle suspension as defined in claim 1 comprising an end cap for said cylinder member of said hydraulic ram means, said end cap being carried by said vehicle frame, a flexible diaphragm clamped between said cylinder member and said end cap and cooperating with the latter to define a pneumatic chamber constituting said pneumatic spring means, said movable member of said ram means being a piston member engaged in said cylinder member, said piston member being connected to one of said link members, and means for admitting said hydraulic medium to said cylinder member between said piston member and said diaphragm.

References Cited in the file of this patent
UNITED STATES PATENTS

| | | |
|---|---|---|
| 2,161,431 | Rabe | June 6, 1939 |
| 2,323,204 | Cross | June 29, 1943 |
| 2,825,579 | Heiss | Mar. 4, 1958 |
| 2,879,057 | Heiss | Mar. 24, 1959 |
| 2,896,965 | Moustakis | July 28, 1959 |
| 2,912,235 | Walker | Nov. 10, 1959 |